United States Patent [19]
Maeda et al.

[11] Patent Number: 5,387,889
[45] Date of Patent: Feb. 7, 1995

[54] SUPERCONDUCTING MAGNET APPARATUS

[75] Inventors: Hideaki Maeda; Takashi Yazawa; Ikuo Tashiro, all of Yokohama, Japan

[73] Assignee: Kabushiki Kaisha Toshiba, Kawasaki, Japan

[21] Appl. No.: 858,876

[22] Filed: Mar. 27, 1992

[30] Foreign Application Priority Data

Mar. 29, 1991 [JP] Japan .................................. 3-091701

[51] Int. Cl.⁶ ..................... H01F 1/00; B60L 13/02; F25B 19/00
[52] U.S. Cl. .................................. 335/216; 104/285; 62/51.1
[58] Field of Search ................... 335/216; 324/318; 505/705; 104/281–286; 62/51.1

[56] References Cited
U.S. PATENT DOCUMENTS 4,876,510  10/1989  Siebold .............................. 324/318

FOREIGN PATENT DOCUMENTS

| 59-47782 | 3/1984 | Japan | 335/216 |
| 2165901 | 7/1987 | Japan | 335/216 |
| 0174708 | 3/1989 | Japan | 335/216 |
| 0115107 | 5/1989 | Japan | 335/216 |

*Primary Examiner*—Leo P. Picard
*Assistant Examiner*—Stephen T. Ryan
*Attorney, Agent, or Firm*—Oblon, Spivak, McClelland, Maier, & Neustadt

[57] ABSTRACT

A superconducting magnet apparatus such as a superconducting magnet for supplying a levitating force to a magnetically levitating train comprises a closed loop-shaped superconducting coil, a container for containing the superconducting coil, a coolant contained in the container, for keeping the superconduction state of the superconducting coil, a metallic member situated outside the container, and path apparatus situated outside the container, for suppressing heat which is generated in the container, the path apparatus having an electric conductivity higher than that of the container and being made of a superconducting wire for causing eddy current occurring outside the container to flow with a small quantity of heat generated.

11 Claims, 9 Drawing Sheets

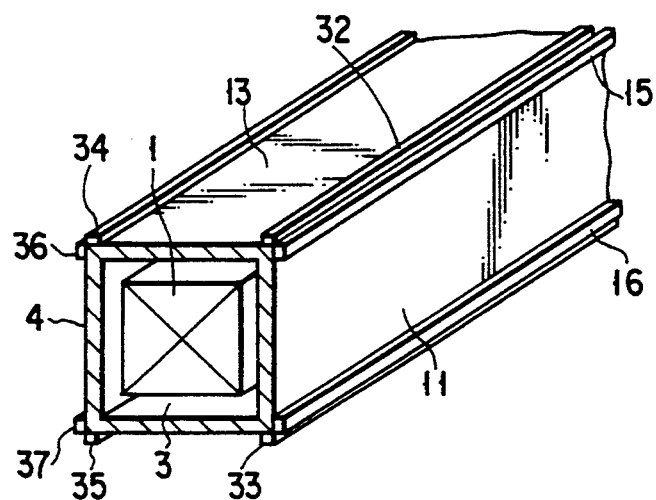
F I G. 10
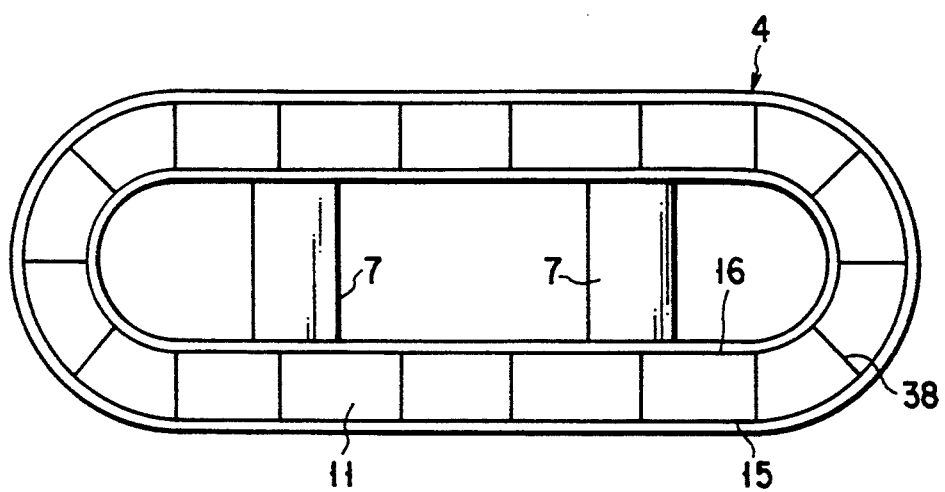
F I G. 11

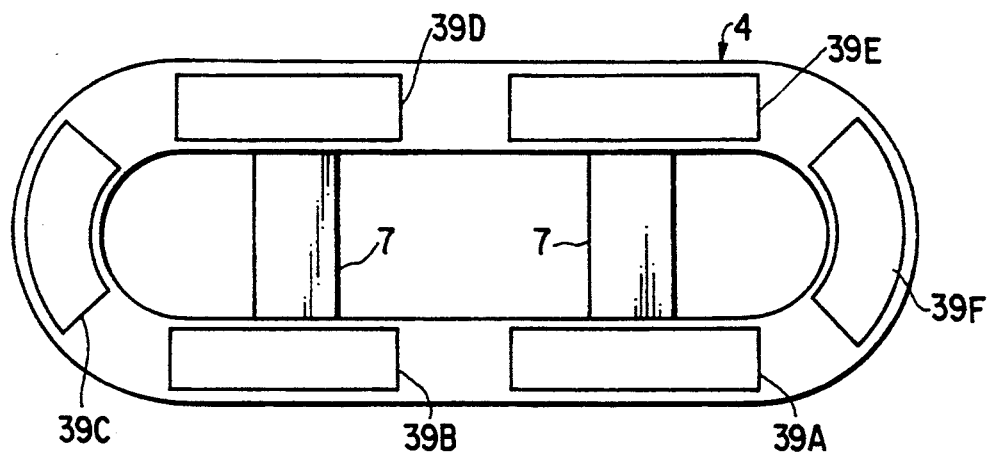
F I G. 12
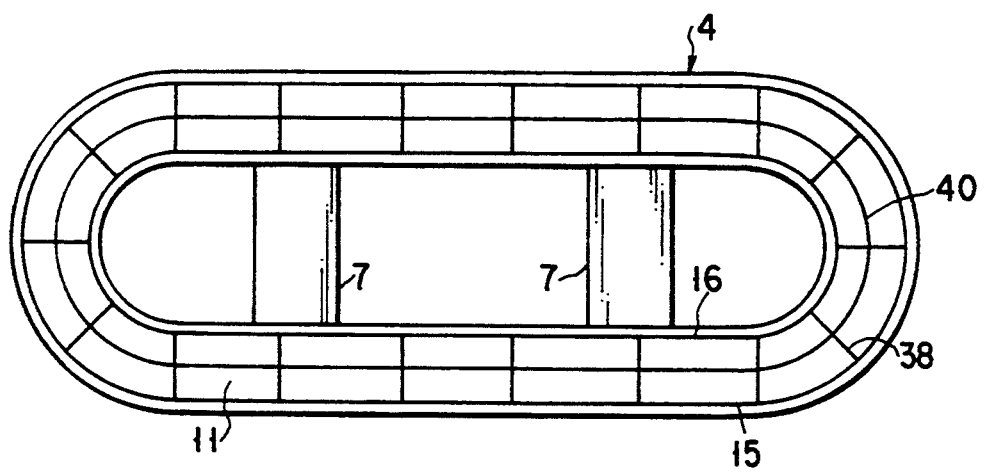
F I G. 13
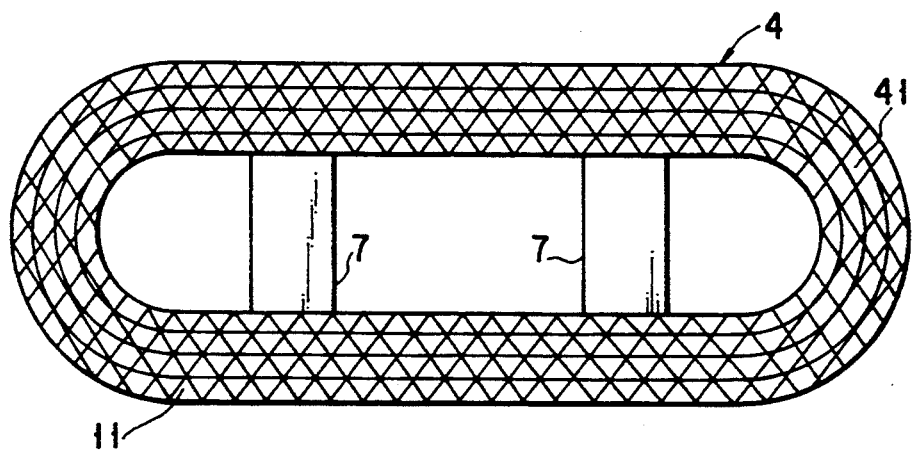
F I G. 14

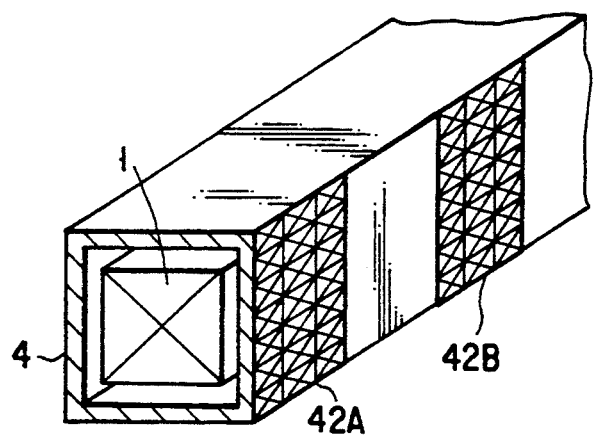
F I G. 15
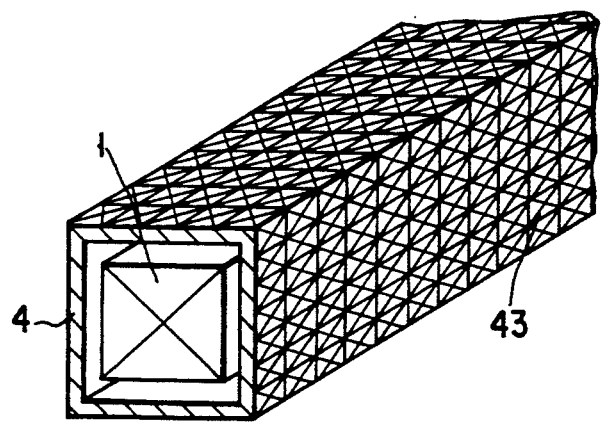
F I G. 16
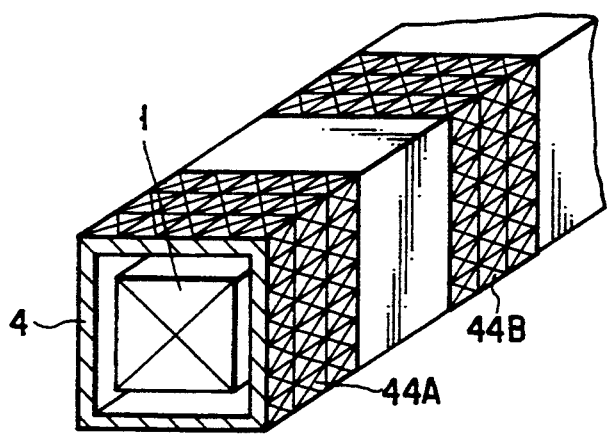
F I G. 17

SUPERCONDUCTING MAGNET APPARATUS

BACKGROUND OF THE INVENTION

1. Field of the Invention

The present invention relates to a superconducting magnet apparatus such as a superconducting magnet for supplying a levitating force to a magnetically levitating train.

2. Description of the Related Art

FIGS. 1 and 2 show this type of conventional superconducting magnet apparatus using an annular superconducting coil. The superconducting coil has, for example, a racetrack-shape. The superconducting coil is manufactured such that a superconductor is formed in a racetrack-shape and epoxy resin is impregnated in the superconductor in a vacuum state.

As is shown in FIGS. 1 and 2, a superconducting coil 1 is housed in a heat-insulating container 2. The container 2 has a storage unit 3 with a racetrack-shape similar to that of the superconducting coil 1. The storage unit 3 includes an inner container 4 containing the superconducting coil 1 and a coolant (typically, liquid helium), an outer container 5 having a normal temperature and containing the inner container 4, and a heat-shield plate 6 provided between the outer container 5 and the inner container 4.

The inner container 4 is normally formed of stainless steel, in order to attain mechanical strength. The inner container 4 is fixed in the outer container 5 via a plurality of heat-insulating supports (not shown). The superconducting coil 1 is firmly fixed in the inner container 4, with a coolant passageway provided. The space between the inner container 4 and the outer container 5 functions as a vacuum heat-insulating layer. The heat shield plate 6 is situated within the vacuum heat-insulating layer, and is normally formed of a metal with high thermal conductivity such as copper or aluminum. The heat shield plate 6 is cooled to an intermediate temperature by means of a cooling system (not shown). In FIG. 1, reinforcing members 7 made of, e.g. stainless steel are provided to reinforce the inner container 4. This structure is adopted to attain higher strength, lighter weight, and smaller size.

However, this superconducting magnet apparatus has the following problem.. While the magnetically levitating train on which this superconducting magnet apparatus is mounted is running, the amount of evaporated coolant in the inner container 4 is greater than in the case where the train does not move. This is due to the following mechanism. When the train starts to run, an electromagnetic force acting between the superconducting magnet apparatus mounted on the train and a levitating/ propelling coil on the ground varies. Owing to the variation in electromagnetic force, the superconducting coil 1 vibrates and consequently a relative displacement occurs between the superconducting coil 1 and the heat shield plate 6. As a result of the relative displacement, eddy current occurs in the heat shield plate 6. Within the varying magnetic field produced by the eddy current, eddy current flows through the wall of the inner container 4. The heat generated by the eddy current in the wall of the inner container increases the amount of evaporated coolant. Thus, in the conventional superconducting magnet apparatus, a large-capacity refrigerator must be mounted on the train.

In order to overcome the above problem, it is thought that the inner container is formed of a non-magnetic, non-electrically-conductive material such as fiber-reinforced plastic. In this case, however, in order to attain a mechanical strength equal to that of the stainless steel inner container, the size of the inner container must be increased.

As has been described above, when the conventional superconducting magnet apparatus is mounted on, in particular, a magnetically levitating train, the amount of evaporated coolant increases and the large-capacity refrigerator must be required.

SUMMARY OF THE INVENTION

The object of the present invention is to provide a superconducting magnet apparatus capable of reducing the amount of evaporated coolant, without making the construction of the apparatus complex or lowering the mechanical strength of the apparatus, even when the magnet apparatus is mounted on a magnetically levitating train.

The object of the present invention can be achieved by a superconducting magnet apparatus comprising:
  a closed loop-shaped superconducting coil;
  a container for containing the superconducting coil;
  a coolant contained in the container, for keeping the superconduction state of the superconducting coil; and
  suppressing means, situated within the container, for suppressing heat which is generated in the container.

This object can also be achieved by a superconducting magnet apparatus comprising:
  a closed loop-shaped superconducting coil;
  a container for containing the superconducting coil;
  a coolant contained in the container, for keeping the superconduction state of the superconducting coil:
  a metallic member situated outside the container; and
  path means, situated outside the container, for suppressing heat which is generated in the container, said path means having an electric conductivity higher than that of the container and causing eddy current occurring outside the container to flow with a small quantity of heat generated.

The object of the invention can also be achieved by a superconducting magnet apparatus comprising:
  a closed loop-shaped superconducting coil;
  a container for containing the superconducting coil;
  a coolant contained in the container, for keeping the superconduction state of the superconducting coil;
  a metallic member situated outside the container; and
  path means, situated outside the container, for suppressing heat which is generated in the container, said path means having an electric conductivity higher than that of the container and being made of a superconducting wire for causing eddy current occurring outside the container to flow-with a small quantity of heat generated.

According to the above superconducting magnet apparatus, when the superconducting coil and the heat shield plate are displaced relative to each other, eddy current flows through the heat shield plate. The eddy current generates a varying magnetic field. The varying magnetic field tends to penetrate a metallic wall of the inner container. However, since the closed current path formed of an electrically conductive material with an electrical conductivity higher than that of the wall of the inner container is provided on the outer surface of the inner container, the magnetic shield function of the closed current path prevents the varying magnetic field from permeating into the wall of the inner container. Accordingly, the quantity of eddy current flowing to the wall of the inner container, which is due to the varying field, can remarkably be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 10 is a perspective view showing important part of a superconducting magnet apparatus according to a fourth embodiment of the invention;

FIGS. 11 to 14 are plan views of inner containers of superconducting magnet apparatuses according to fifth to eighth embodiments of the invention; and FIGS. 15 to 17 are perspective views showing important parts of superconducting magnet apparatuses according to ninth to eleventh embodiments.

DETAILED DESCRIPTION OF THE PREFERRED EMBODIMENTS

Embodiments of the present invention will now be described with reference to the accompanying drawings.

Figure 1:
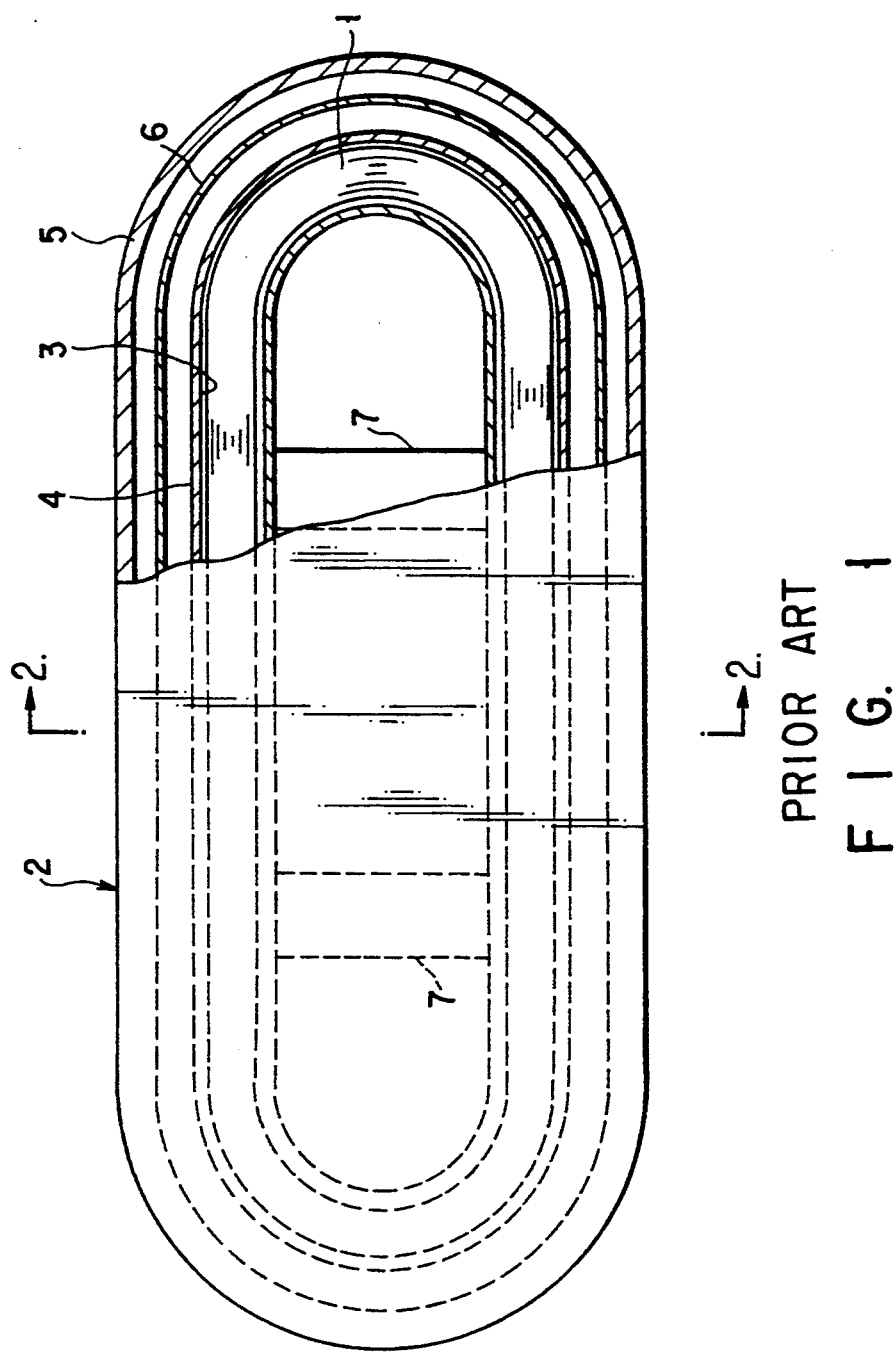
FIG. 1 is a partially exploded plan view of a superconducting magnet apparatus for supplying a levitating force to a magnetically levitating train.
Figure 2:
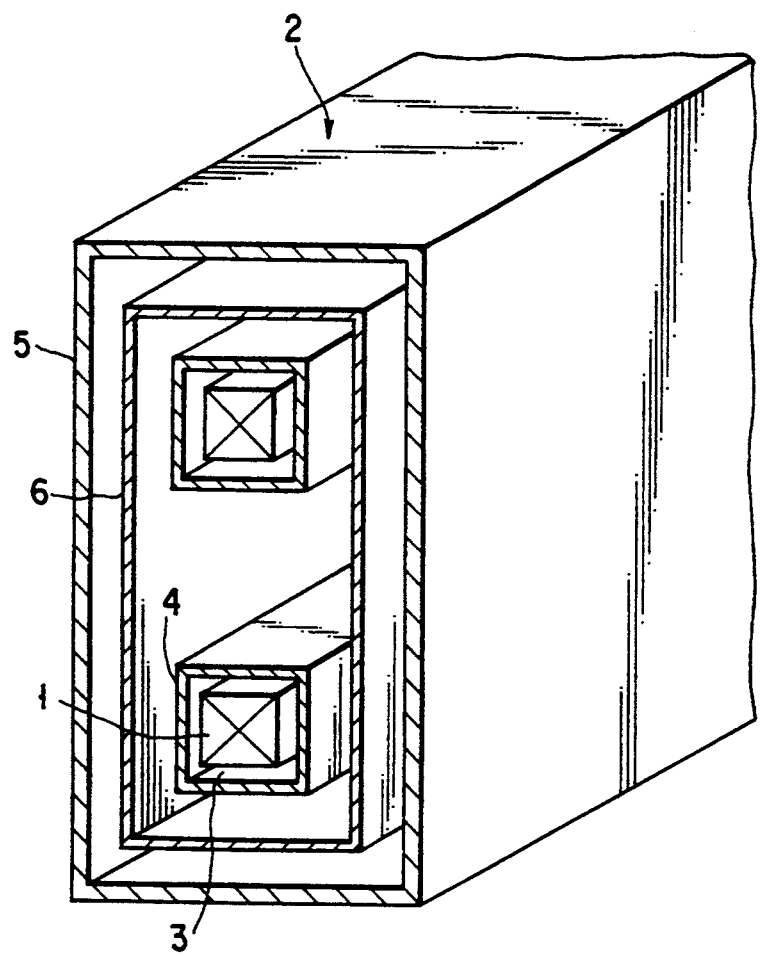
FIG. 2 is a cross-sectional view taken along line A—A in FIG. 1.
Figure 3:
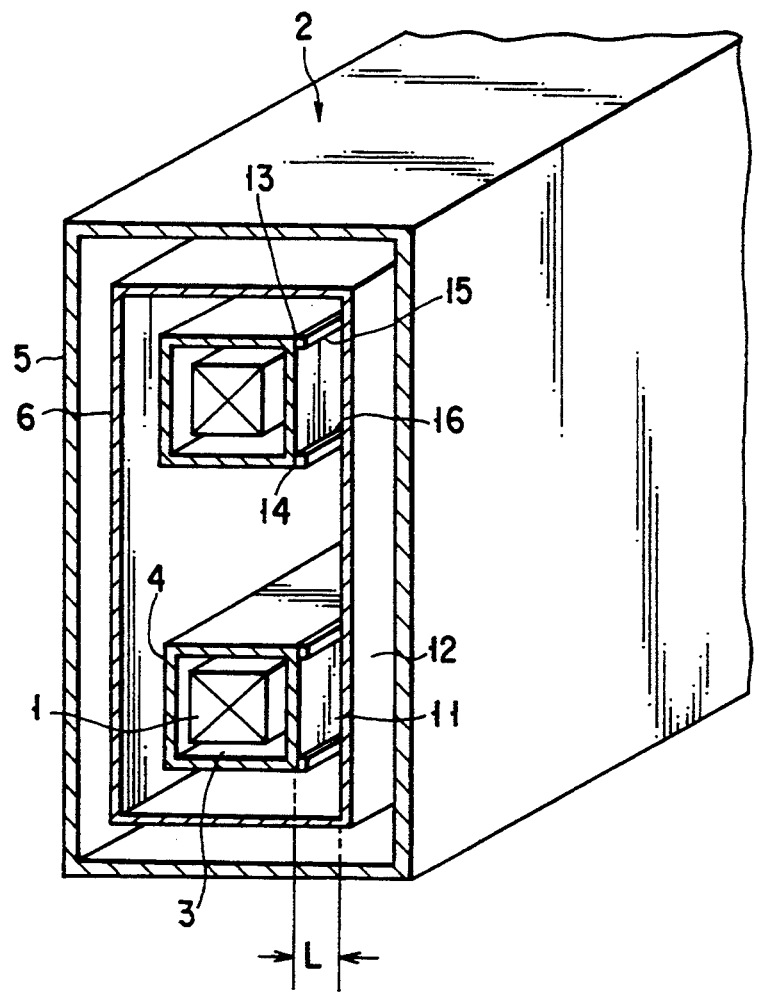
FIG. 3 is a cross-sectional view showing part of a superconducting magnet apparatus according to a first embodiment of the present invention.

FIG. 3 shows part of a superconducting magnet apparatus according to a first embodiment of the present invention, which is mounted on a magnetically levitating train for levitating the train. The structural elements common to those in FIGS. 1 and 2 are denoted by like reference numerals, and a detailed description thereof is omitted.

In the first embodiment, when the superconducting magnet apparatus is actually mounted on the train, the right side (in FIG. 3) thereof faces a ground coil not shown). The inner container 4 is formed of a non-magnetic metal material such as stainless steel, and the heat shield plate 6 is formed of a metal material.

In this type of superconducting magnet apparatus, the distance between the superconducting coil 1 and the ground coil is limited in order to enhance the efficiency of electromagnetic force. Normally, the inner container 4 containing the superconducting coil 1 is displaced to the right (in FIG. 3) within the outer container 5. Thus, although there are two walls of the inner container 4 which are opposed to the heat shield plate 6 in the axial direction of the superconducting coil 1, the distance (L) between the right wall 11 and part 12 of the heat shield plate 6 is shorter.

In the region of distance L, when relative displacement occurs between the superconducting coil 1 and the heat shield plate 6, as stated above, a large eddy current tends to flow through the part 12 of the heat shield plate 6. If a varying magnetic field is generated by the eddy current, eddy current flows through the wall 11 and consequently heat is generated in the wall 11. The heat generated increases the amount of evaporated coolant in the inner container 4, as mentioned above.

Figure 4:
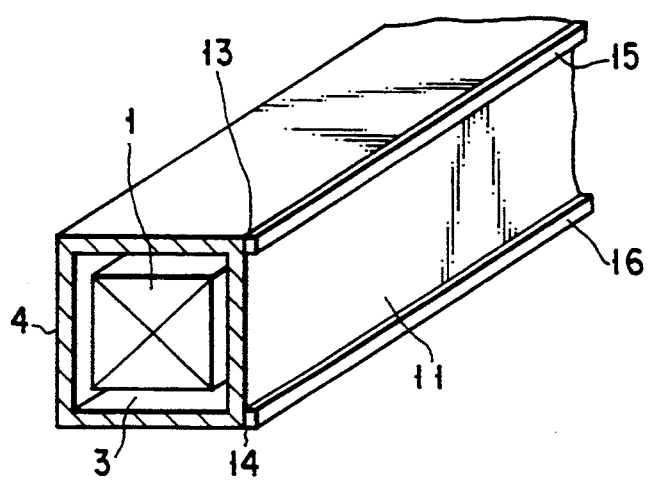
FIG. 4 is a perspective view of important part of the superconducting magnet apparatus shown in FIG. 3.
Figure 5:
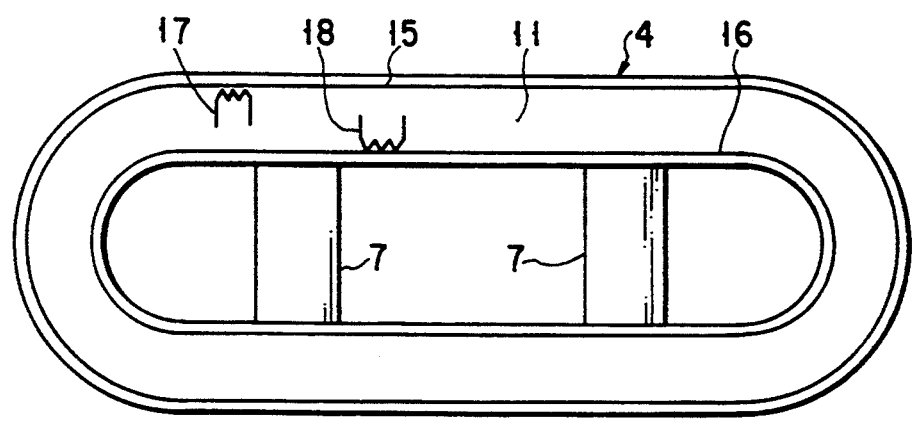
FIG. 5 is a plan view of an inner container, showing the arrangement of a closed current path in the superconducting magnet apparatus shown in FIG. 3.

In order to solve this problem, in this embodiment, the wall 11 of the inner container 4, which is situated on the ground coil side, has closed current paths 15 and 16 along its outer and inner edges 13 and 14, as shown in FIGS. 4 and 5, too. The closed current paths 15 and 16 function as suppressing means and eddy current passage means.

The closed current paths 15 and 16 are formed of a material having a higher electrical conductivity than the metal of the wall 11, for example, superconducting wires in this embodiment. Specifically, the wire elements of the superconducting wires are formed of an alloy such as NbTi or NbZr, or an intermetallic compound such as $Nb_3Sn$ or $V_3Ga$. Each superconducting wire made of the wire elements has a composite structure comprising a matrix of copper or copper nickel alloy, and a conductor such as a DC monolithic conductor, DC stranded conductor, AC monolithic conductor with less AC loss, or AC stranded conductor. In order to constitute one turn, end portions of each superconducting wire are connected directly or by means of solder, and the wires are fixed to the outer and inner edges 13 and 14 of the wall 11. The superconducting wires are cooled by the coolant contained in the inner container 4 through the wall 11.

The closed current paths 15 and 16 may be formed of an oxide superconductor having a high critical temperature. The paths 15 and 16 may be electrically insulated from the wall 11. As fixing means, a winding frame may be formed at the outer and inner edges 13 and 14 of the wall 11, and the paths 15 and 16 may be wound along the frame. Alternatively, the paths 15 and 16, which are wound in advance to constitute closed paths, may be adhered by epoxy resin or other adhesive to the outer and inner edges 13 and 14 of the wall 11 or may be fixed by using fixing members.

In this embodiment, the closed current paths 15 and 16 are formed of superconducting wires. Where the closed current paths 15 and 16 formed of superconducting wires are situated adjacent to the superconducting coil 1, current is induced in the paths 15 and 16 when the coil 1 is magnetized or demagnetized. If the current increases excessively, normal conduction transition occurs in the superconducting wires and the wires may be burnt. In addition, the magnetic field generated by the superconducting coil 1 may be shielded by the presence of the closed current paths 15 and 16 constituted by the superconducting wires, and a desired external magnetic field may not be produced.

In this embodiment, as shown in FIG. 5, electric heaters 17 and 18 are wound around or attached to part of the closed current paths 15 and 16. When the superconducting coil 1 is magnetized or demagnetized, power is supplied to the electric heaters 17 and 18 and the part of the closed current paths 15 and 16 is transited to normal conduction, thereby increasing the resistance of the closed current paths 15 and 16 and suppressing induced current. To achieve the same function, a thermal permanent current switch may be provided at part of the closed current paths 15 and 16. In this case, protective resistors or diodes are connected to both ends of the switch, for protection of the switch when the part of the paths 15 and 16 is set in the normal conduction state.

With this structure, when eddy current is caused at the part 12 of the shield plate 6 by the relative displacement of the superconducting coil 1 and heat shield plate 6, a varying magnetic field is produced by the eddy current. The varying magnetic field tends to act on the wall 11 of the inner container 4. However, the wall 11 is shielded from the varying magnetic field by the presence of the closed current paths 15 and 16. Thus, the amount of eddy current generated in the wall 11 by the varying magnetic field can be reduced, with the result that heat generation of the wall 11 due to the eddy current in the wall 11 can be suppressed and evaporation of coolant prevented.

Accordingly, in this embodiment, since the closed current paths 15 and 16 formed of superconducting wires with infinitely high electric conductivity are provided along the outer and inner edges 13 and 14 of the wall 11 of the inner container 11, extension of magnetic field to the inside of the outer edge 13 or to the outside of the inner edge 14 can be prevented. In other words, magnetic shield function can be given to the closed current paths 15 and 16. Thereby, eddy current in the wall 11 can be suppressed, and heat generation of the wall 11 due to eddy current prevented. Accordingly, evaporation of coolant in the inner container 4 can be suppressed.

Figure 6:
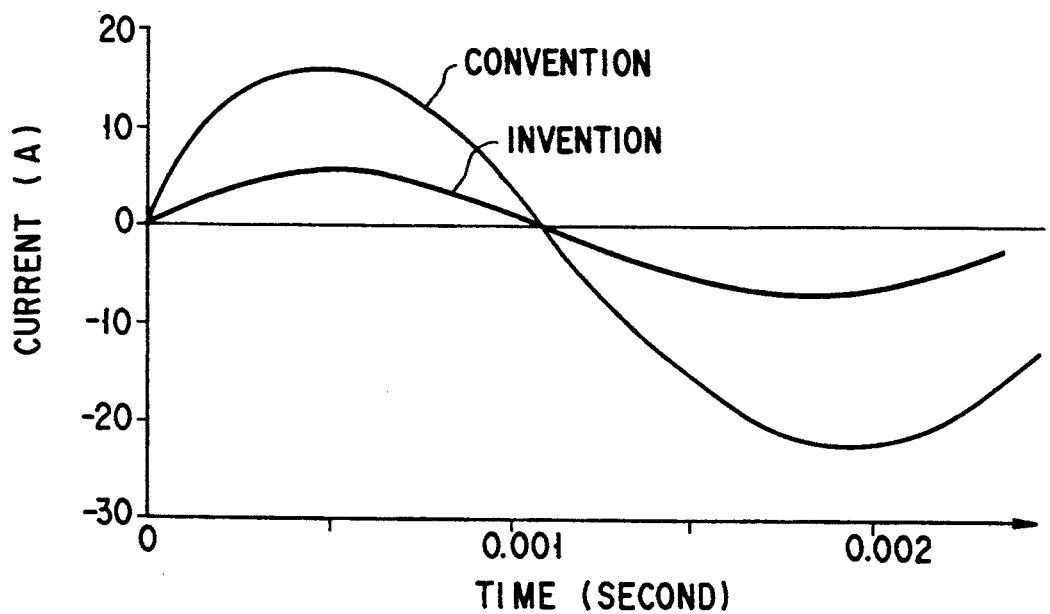
FIG. 6 is a graph showing a level of eddy current produced by a varying magnetic field in the case where a closed current path is not provided.
Figure 7:
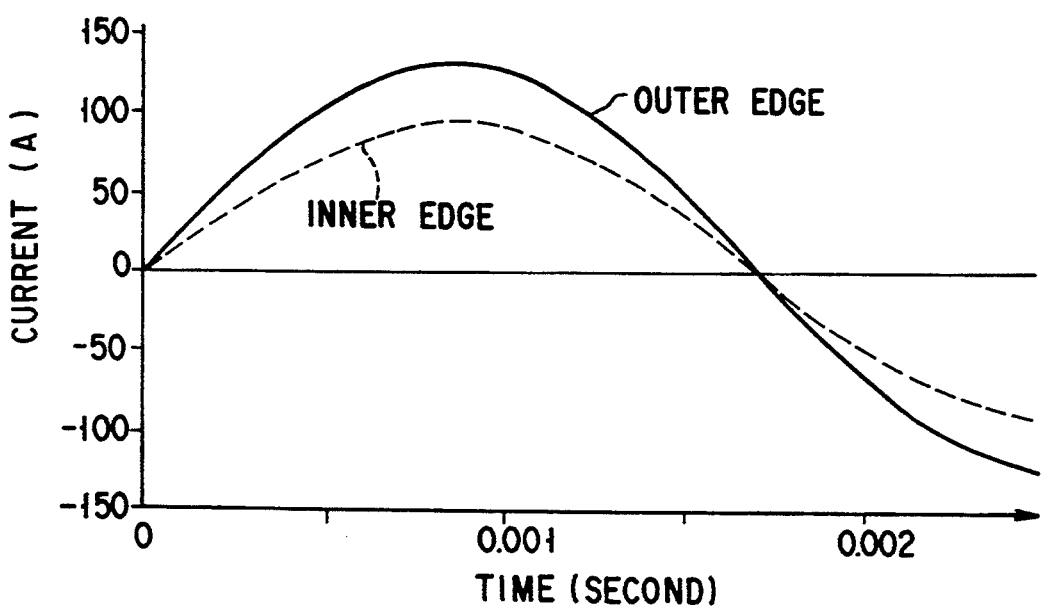
FIG. 7 is a graph showing a level of current induced in the closed current path in the case where the closed current path is provided.

The inventors obtained the following calculation results. A hollow disc of stainless steel having an inside diameter of 44 cm, an outside diameter of 58 cm and a thickness of 3 mm was prepared. A varying magnetic field with a single amplitude 10 gauss and an oscillation frequency of 300 Hz was applied vertically to the surface of the hollow disc. The value of eddy current at locations determined from the inner edge towards the outer edge of the disc at regular intervals of 1 cm was substantially uniform, i.e. 13 A to 17 A. FIG. 6 shows a variation in eddy current just after the magnetic field was applied to some location. The reason for this is that the magnetic field entered over the entire width of 7 cm. On the other hand, closed current paths constituted by superconducting wires were attached to the outer and inner edges of the same hollow disc and a varying magnetic field was applied thereto under the same condition. It was found, as shown in FIG. 7, that a current of 135 A flowed through the outer closed current path and a current of 94 A flowed through the inner closed current path, and that the eddy current occurring at respective points in the radial direction of the disc was 3 A to 5 A in FIG. 6, which was ¼ to 1/5, as compared to the case where the closed current paths were not attached.

Accordingly, where the closed current paths 15 and 16 formed of superconducting wires were provided at the outer and inner edges 13 and 14 of the wall 11, as in the present embodiment, the eddy current occurring at the wall 11 due to the varying magnetic field can be suppressed, with the result that evaporation of coolant in the inner container 4 can be prevented.

Figure 8:
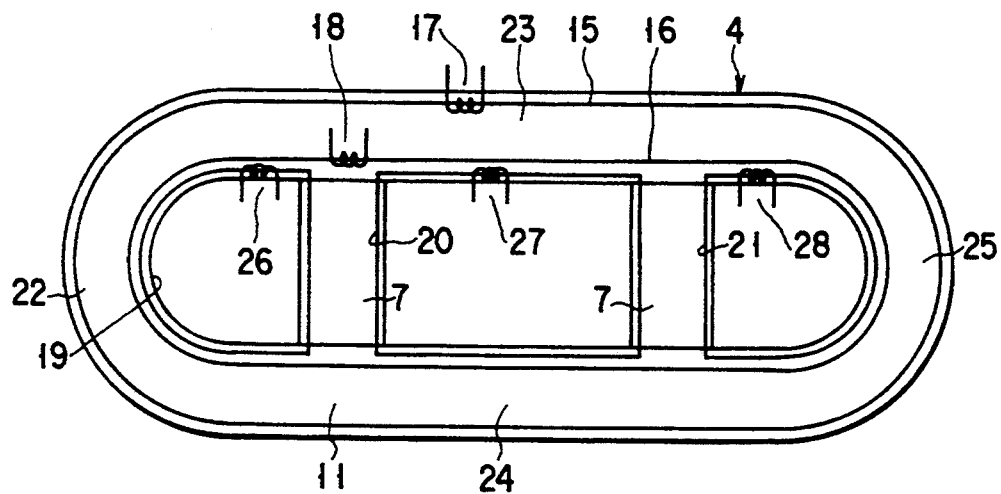
FIG. 8 is a plan view of an inner container, showing the arrangement of a closed current path in a superconducting magnet apparatus according to a second embodiment of the invention.

FIG. 8 shows schematically important parts of a superconducting magnet apparatus according to a second embodiment of the invention.

In the second embodiment, three closed current paths 19, 20 and 21 are added to the first embodiment shown in FIGS. 3 and 4. Like the closed current paths 15 and 16, each of the three closed current paths 19, 20 and 21 is constituted by a single-turn superconducting wire.

The closed current path 19 is provided on an inner edge of a peripheral circuit constituted by a curved part 22 of the wall 11 of the inner container 4 and one reinforcing member 7 provided so as to connect both ends of the part 22. The closed current path 20 is provided on an inner edge of a peripheral circuit constituted by two straight parts 23 and 24 of the wall 11 of the inner container 4 and two reinforcing members 7 provided so as to connect both ends of the parts 23 and 24. The closed current path 21 is provided on an inner edge of a peripheral circuit constituted by the other curved part 25 of the wall 11 of the inner container 4 and one reinforcing member 7 provided so as to connect both ends of the part 25. Electric heaters 26, 27 and 28 are wound around or attached to parts of the closed current paths 19, 20 and 21. Electric power is supplied to the heaters 26, 27 and 28 when the superconducting coil 1 is magnetized or demagnetized, thereby transiting the parts of the closed current paths 19, 20 and 21 into normal conduction state, increasing the resistance values of the closed current paths 19, 20 and 21, and suppressing induction current.

with this structure, the same advantages as with the preceding embodiment can be obtained. In this embodiment, when the reinforcing members 7 are formed of a non-electrically conductive material, the closed current paths 19, 20 and 21 may be omitted.

The present invention is not limited to the above embodiments. In the above embodiments, each closed current path is constituted by a single-turn superconducting wire, but it may be constituted by two or more turns of superconducting wire. In the above embodiments, the closed current paths are provided on the outer and inner edges of the wall of the inner container 4, but one or more closed current paths may be additionally provided at positions between these current paths. In the above embodiments, the closed current paths are provided on the outer surface of the wall of the inner container, which faces the heat shield plate in the axial direction of the superconducting coil, but they may be provided on the outer surface of the opposite wall or on the outer surfaces of the other two walls. The details regarding this will be stated later.

In the above embodiments, the closed current path is formed of a superconducting wire, but it may be formed of a material with an electrical conductivity that is higher than that of the material of the inner container, e.g. a copper alloy, an aluminum alloy, etc.

Third to eleventh embodiments of the invention will now be described with reference to FIGS. 9 to 17.

Figure 9:
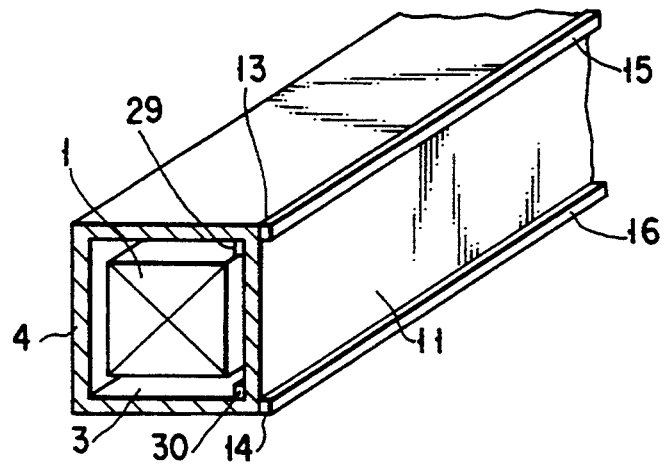
FIG. 9 is a perspective view showing important part of a superconducting magnet apparatus according to a third embodiment of the invention.

As is shown in FIG. 9, in a superconducting magnet apparatus according to the third embodiment of the invention, closed current paths 29 and 30 are provided on the inner wall of the inner container 4. The closed current paths 29 and 30 may be formed of the same material as the closed current paths 15 and 16, but they should desirably be formed of a superconducting material. Thereby, the closed current paths 29 and 30 are constituted as superconducting closed current paths and can effectively reduce eddy current.

As is shown in FIG. 10, in a superconducting magnet apparatus according to the fourth embodiment of the invention, closed current paths 15, 16, 32, 33, 34, 35, 36 and 37 are provided on all outer walls of the inner container 4. Thereby, eddy current occurring at the outer walls of the inner container 4 can effectively be reduced.

As is shown in FIG. 11, in a superconducting magnet apparatus according to the fifth embodiment of the invention, conductors 38 are connected between the closed current paths 34 and 35 at given intervals along the direction in which the closed current paths 34 and 35 extend. Thereby, eddy current occurring at the outer walls of the inner container 4 can effectively be reduced.

As is shown in FIG. 12, in a superconducting magnet apparatus according to the sixth embodiment of the invention, closed current paths 39A, 39B, 39C, 39D, 39E and 39F are provided on an outer wall of the inner container 4 at given intervals. Specifically, the closed current paths are arranged in island-shapes along the direction in which one outer wall of the inner container 4 extends. Thereby, eddy current occurring at the outer walls of the inner container 4 can effectively be reduced.

As is shown in FIG. 13, in a superconducting magnet apparatus according to the seventh embodiment of the invention, a closed current path 40 is added between the closed current paths 15 and 16 of the fourth embodiment. Thereby, eddy current occurring at the outer walls of the inner container 4 can effectively be reduced.

As is shown in FIG. 14, in a superconducting magnet apparatus according to the eighth embodiment of the invention, a mesh circuit 41, which is desirably made of superconducting wires, is provided over the entire surface of an outer wall of the inner container 4 along the direction in which the wall extends. In order to attain good magnetic shield effect, the mesh size of the mesh circuit 41 is set at 10 mm or less. The mesh circuit 41 is attached to the outer wall of the inner container 41 by means of coupling means such as lead-tin solder or indium solder. As the coupling means, screwing or welding may be adopted. Of course, the mesh circuit 41 may be formed of a material other than superconducting wires, e.g. the same material as that of the closed current paths 15 and 16. Thereby, eddy current loops occurring at the outer walls of the inner container 4 can be reduced, and heat generated by the eddy current can effectively be reduced.

As is shown in FIG. 15, in a superconducting magnet apparatus according to the ninth embodiment of the invention, mesh circuits 42A and 42B are attached to an outer wall of the inner container 4 in island-shapes. Thereby, the eddy current loops can be reduced, and the influence of the eddy current occurring in the inner container 4 can be reduced. In this case, the distance between the islands, i.e. the mesh circuits 42A and 42B is set at 1 mm or less, thereby suppressing magnetism permeating into the inner container 4.

As is shown in FIG. 16, in a superconducting magnet apparatus according to the tenth embodiment of the invention, a mesh circuit 43 is attached to all outer walls of the inner container 4. Thereby, eddy current occurring at the outer walls of the inner container 4 can effectively be reduced.

As is shown in FIG. 17, in a superconducting magnet apparatus according to the eleventh embodiment of the invention, mesh circuits 44A and 44B are attached to all outer walls of the inner container 4 in island-shapes. Thereby, the eddy current loops can be reduced, and the influence of the eddy current occurring in the inner container 4 can be reduced.

The closed current paths and mesh circuits may be grounded to the outer container 5, or may not. An insulating member may be interposed between the inner container 4, on the one hand, and the closed current paths and mesh circuits, on the other. As with the case shown in FIG. 9, the mesh circuits may be provided on the inner walls of the inner container 4.

In the embodiments 1 to 11 described above, the heat shield plate 6 can be made of CFRP (Carbon-Fiber Reinforced Plastic) or the like. If the plate 6 is made of such a material, no eddy currents will be generated in the plate 6 even if the place 6 moves relative to the superconducting coil 1. In this case, no eddy currents will flow within the inner container 4. A superconducting magnetic apparatus, whose heat shield plate 6 is made of CFRP or the like, is advantageous in that the inner container 4 radiates but a very small amount of heat, whereby evaporation of the coolant (e.g., liquid helium) is reduced to a minimum. Hence, the apparatus is useful, in particular if it is incorporated in a magnetically levitating train.

The embodiments 1 to 11 are superconducting magnetic apparatuses which are designed for use in magnetically levitating trains. Nonetheless, the apparatus of the present invention can be used in any other system, such as an MRI system, wherein a superconducting coil vibrates relative to another metal member, to change the intensity of a magnetic filed and ultimately generate an eddy current in the container holding the coil and a coolant.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A superconducting magnet apparatus adapted to be used in a magnetically levitating train system having a ground coil, comprising:

a superconducting coil having a racetrack shape;

a coil container, having a racetrack shape that is similar to the superconducting coil, for containing the superconducting coil;

a metallic heat shield that is situated outside the coil container for shielding the coil container from heat;

a coolant contained in the coil container, for maintaining the superconducting state of the superconducting coil; and a superconducting wire, situated on at least one of two walls of the coil container which are opposed to the ground coil, for suppressing heat which is generated in the coil container and resulting in eddy current occurring outside the coil container generating less heat.

2. A apparatus according to claim 1, wherein said superconducting wire has a superconduction state at a relatively low temperature and a normal conduction state at a relatively high temperature, further comprising transition means for transiting, selectively, at least part of the superconducting wire from its superconduction state to its normal conduction state.

3. The apparatus according to claim 2, wherein said transition means is an electric heater.

4. The apparatus according to claim 1, further comprising a metallic outer container for storing said coil container.

5. A superconducting magnet apparatus adapted to be used in a magnetically levitating train system having a ground coil, comprising:

a superconducting coil having a racetrack shape;

an inner container having a racetrack shape that is similar to the shape of the superconducting coil, for containing the superconducting coil;

a coolant contained in the inner container, for maintaining the superconducting state of the superconducting coil;

a heat-shield plate situated outside the inner container;

an outer container for containing the inner container and the heat-shield plate; and closed current paths formed of superconducting wire being situated on at least one of two walls of the inner container which are opposed to the ground coil, for suppressing heat generation in the inner container, said paths causing eddy current occurring outside the inner container to flow within them thereby reducing the quantity of generated heat.

6. A superconducting magnet apparatus adapted to be used in a magnetically levitating train system having a ground coil, comprising:

a superconducting coil having a racetrack shape;

an inner container having a racetrack shape that is similar to the shape of the superconducting coil, for containing the superconducting coil;

a coolant contained in the inner container, for maintaining the superconducting state of the superconducting coil;

a heat-shield plate situated outside the inner container;

an outer container for containing the inner containing and the heat-shield plate; and mesh circuits formed of superconducting wire, situated on at least one of two walls of the inner container which are opposed to the ground coil, for suppressing heat generation in the inner container, said mesh circuits resulting in eddy current occurring outside the inner container generating less heat.

7. A superconducting magnet apparatus adapted to be used in a magnetically levitating train system having a ground coil, comprising:

a superconducting coil having a racetrack shape;

a coil container, having a racetrack shape that is similar to the superconducting coil, for containing the superconducting coil;

a metallic heat shield that is situated outside the coil container for shielding the coil container from heat;

a coolant contained in the coil container, for maintaining the superconducting state of the superconducting coil;

a mesh, formed of superconducting wires having a superconduction state and situated on at least one of two walls of the coil container which are opposed to the ground coil, for providing mesh currents and suppressing heat which is generated in the coil container.

8. The apparatus according to claim 7, further comprising transition means for transiting, selectively, at least part of the mesh from its superconduction state.

9. The apparatus according to claim 8, wherein said transition means is an electric heater.

10. The apparatus according to claim 7, wherein said mesh comprises a conductor consisting of at least one of a DC monolithic conductor, an AC monolithic conductor, and an AC stranded wire.

11. The apparatus according to claim 7, wherein said mesh is arranged in an island-shape on the container.

* * * * *